United States Patent [19]

Franks

[11] Patent Number: 4,903,391
[45] Date of Patent: Feb. 27, 1990

[54] DISC BRAKE TOOL

[76] Inventor: Joe R. Franks, 8200 Blue Spruce Dr., Hixon, Tenn. 37343

[21] Appl. No.: 293,190

[22] Filed: Jan. 3, 1989

[51] Int. Cl.[4] ............................................. B23P 19/04
[52] U.S. Cl. ........................................ 29/239; 29/266
[58] Field of Search ................. 29/239, 256, 258, 263, 29/264, 266, 233; 254/100, 101

[56] References Cited

U.S. PATENT DOCUMENTS

| | | | |
|---|---|---|---|
| 3,007,241 | 11/1961 | Gonzalez | 29/266 |
| 3,727,490 | 4/1973 | Diffenderfer et al. | 29/239 |
| 3,835,522 | 9/1974 | Ward | 29/239 |
| 4,086,828 | 5/1978 | Mader | 29/239 |
| 4,274,189 | 6/1981 | Conover . | |
| 4,288,899 | 9/1981 | McKee | 29/256 |
| 4,288,900 | 9/1981 | Overton | 29/263 |
| 4,542,571 | 9/1985 | Sullivan . | |

Primary Examiner—Robert C. Watson

[57] ABSTRACT

A manual means for reducing the time and effort needed to retract a brake-actuation piston into a brake fluid-containment cylinder during a brake pad-replacement operation. A thrust plate has a threaded hole meshed with an elongated screw that is turnable manually to exert a retractive force on a brake-actuation piston.

1 Claim, 1 Drawing Sheet

DISC BRAKE TOOL

BACKGROUND AND SUMMARY OF THE INVENTION

This invention relates to automotive disc brakes, and particularly to a manually-operated means for making it easier to replace worn brake pads.

In automobiles and trucks a brake assembly is provided at each ground wheel. Quite often the front wheels are provided with disc brakes, and the rear wheels are provided with drum brakes. Sometimes disc brakes are provided on both the front wheels and the rear wheels. The present invention is concerned with a mechanism that makes it easier to replace worn brake pads on disc brakes.

A conventional disc brake assembly comprises a circular disc connected to the road wheel, and a caliper mechanism encircling an edge area of the disc at or near the twelve o'clock position. A piston-cylinder means within the caliper mechanism acts on brake pads arranged along opposite faces of the rotating disc to exert a braking force thereon when the motorist applies foot pressure to the brake pedal.

After a period of service the brake pads become worn, thereby necessitating their removal and replacement with new brake pads. One problem encountered during the brake pad-replacement operation is retraction of the associated piston into its cylinder. During service the pads become thinner; when it becomes necessary to replace the pads the piston is in an "extended" position projecting a significant distance from the associated cylinder. Before new pads can be inserted into the caliper mechanism it is necessary to forcibly retract the piston back into the cylinder (because the new pads are appreciably thicker than the worn pads, and therefore take up more axial space in the caliper mechanism). Retraction of the piston into the cylinder is made difficult because the brake fluid in the piston is in a semi-pressurized condition. Also, the piston seals offer some resistance to piston motion. Occasionally the piston-cylinder interface becomes corroded or packed with contaminants or sludge, thus posing another obstruction to retractive motion of the piston.

The present invention relates to a low cost manual mechanism that can be used to readily move a brake actuation piston from an extended position to a retracted position, to thereby facilitate the process of replacing worn brake pads with new brake pads. The manual mechanism is designed so that it can be used on a variety of different disc brake constructions, e.g. Ford, Chevrolet, Plymouth, etc.

THE DRAWINGS

DESCRIPTION OF A PREFERRED EMBODIMENT OF THE INVENTION

Figure 1:
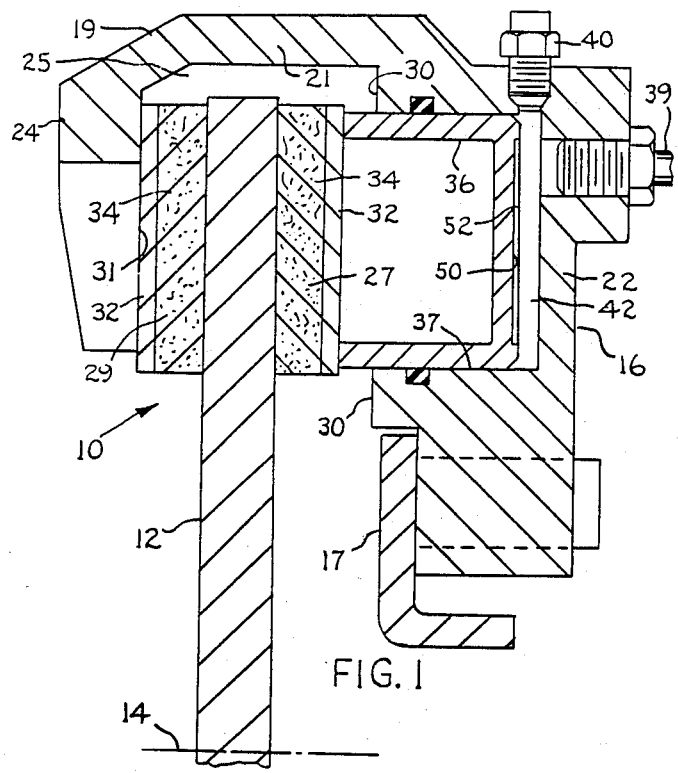
FIG. 1 is a sectional view taken through a disc brake assembly on which the present invention can be used.

FIG. 1 shows a generally conventional automotive disc brake assembly 10 used at a road wheel of a vehicle. A fragmentary portion of the circular brake disc is shown at 12. The disc is attached to the road wheel for rotary motion around wheel axis 14.

The brake assembly comprises a disc brake caliper 16 suitably attached to the vehicle via a mounting bracket 17. The caliper is a U-shaped housing structure 19 that includes a bridge wall 21 and two downwardly-extending end walls 22 and 24 extending normal to wall 21 to circumscribe a space designated by numeral 25.

Brake pads 27 and 29 are removably positioned in space 25 adjacent the inner faces 30 and 31 of respective ones of walls 22 and 24. Each brake pad comprises a metal backing plate 32 and a friction material 34 formed of steel fibers bonded together with organic resins. The brake pads are conventional.

Each pad 27 or 29 has an exposed friction face in close proximity to a side surface of rotary disc 12, such that when the pads are forced to move toward one another they exert frictional braking forces on the disc. The brake-actuating force is provided by a cylindrical piston 36 slidably positioned in a cylindrical bore 37 in caliper end wall 32. Pressurized brake fluid is introduced into bore 37 via a conventional brake line 39. To avoid air in the brake cylinder 37 a conventional bleeder screw (valve) 40 is provided at or near the roof area of bore 37. During normal service bleeder screw 40 is closed.

Introduction of pressurized brake fluid into bore space 42 causes piston 36 to move a minute distance out of bore 37, i.e. toward caliper end wall 24. The associated brake pad 27 thus exerts a frictional braking force on disc 12. Also, caliper housing 19 is automatically shifted a small distance to the right, causing brake pad 29 to exert a frictional braking action on disc 12.

Figure 2:
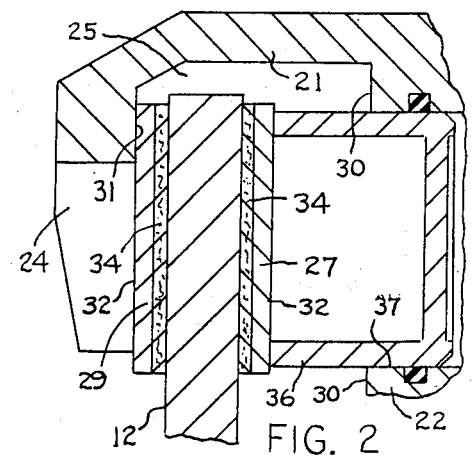
FIG. 2 is a sectional view taken in the same direction as FIG. 1, but after the brake pads have been worn due to extended use.

During service friction materials 34 wear down to the relatively thin conditions shown in FIG. 2. As materials 34 wear down piston 36 automatically shifts out of bore 37 to the FIG. 2 position. During each braking operation piston 36 moves only enough to generate the necessary braking force; the piston moves only a slight distance, without retracting back into bore 37 after each braking event. When it becomes necessary to replace the worn brake pads 27 and 29 (FIG. 2) piston 36 is in an extended position projecting an appreciable distance out of bore 37.

Figure 3:
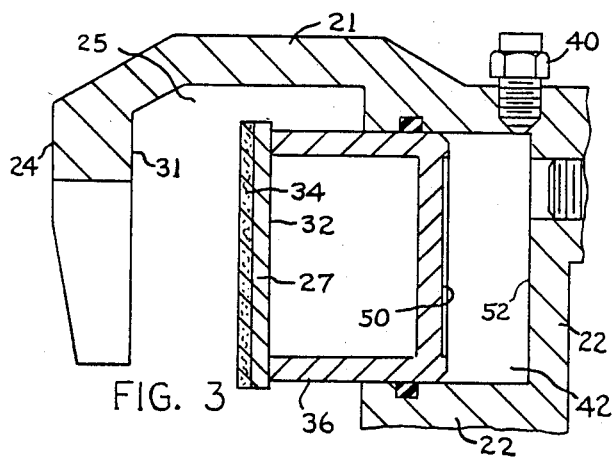
FIG. 3 is a sectional view taken in the same direction as FIG. 2, but with the brake caliper mechanism disassembled from the vehicle, and with one of the brake pads removed, e.g. during an initial stage in the brake pad replacement operation.

FIG. 3 illustrates a condition of the brake assembly part way through a brake pad replacement action. Caliper housing 19 is disconnected from mounting bracket 17 and manually moved so that rotor disc 12 no longer extends into caliper space 25; however housing 19 is still connected to brake line 39 so that cylinder space 42 is liquid-filled. FIG. 3 shows its condition after worn brake pad 29 has been removed from the operating position adjacent to face 31 on caliper end wall 24.

Figure 4:
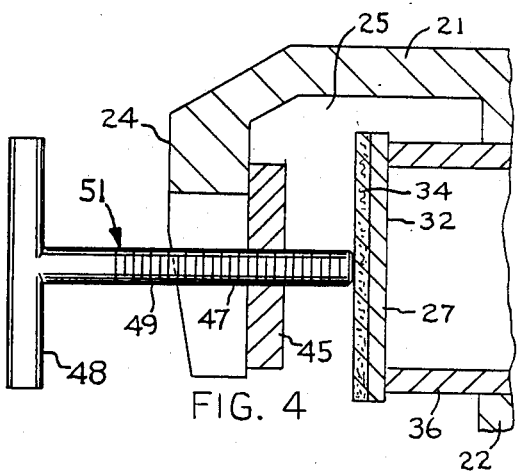
FIG. 4 is a sectional view taken in the same direction as FIG. 3, but showing a manual means of this invention positioned in the caliper mechanism, prior to manual forcement of the brake-actuating piston back to a retracted position.

The present invention is especially concerned with a mean 51 for manually moving piston 36 back into bore 37 from the "extended" position shown in FIG. 3. FIG. 4 shows one form that the invention can take. The manual means 51 there shown comprises a rectangular thrust plate 45 having a threaded hole 47 extended therethrough at or near its central axis. Plate 45 is inserted into caliper space 25 so that threaded hole 47 is in substantial axial alignment with the axis of piston 36. An elongated screw 49 is threaded through hole 47 (prior to insertion of the plate into space 25) such that the screw can be rotated to have pressure engagement against the friction surface of worn brake pad 27. A handle 48 can be attached to the left end of screw 49 to achieve the desired manual turning action.

As screw 49 is advanced rightwardly it exerts an axial pressure on brake pad 27 that is sufficient to cause the pad to force piston 36 back into bore 37 against the resistance offered by the brake liquid in bore space 42 (and other frictional resistances that may be present along the piston-bore interface). The mechanical advantages of the screw enables the piston to be driven into bore 37 with only a moderate manual turning effort on handle 48. It is not necessary to open bleed screw 40 to accomplish the desired piston retractive motion.

Screw 49 rotation is continued until the rear wall 50 of piston 37 is at or very near the rear face 52 of bore 37. At that time screw 49 is turned in the opposite direction to move the right end of the screw out of pressure contact with pad 27; manual means 51 is then withdrawn out of caliper space 25. Also, pad 27 is removed from space 25.

With piston 36 fully retracted into bore 37 there is sufficient space between the exposed end of piston 36 and face 31 of caliper end wall 24 to accommodate new brake pads (similar to the "new" pads shown in FIG. 1).

Thrust plate 45 has a thickness dimension less the thickness of brake pad 29 in the unworn state. As seen in FIG. 4 the plate 45 thickness is approximately the same as that of a worn brake pad, whereby when worn pad 29 is removed from caliper space 25 plate 45 can be inserted into the vacated space.

Figure 5:
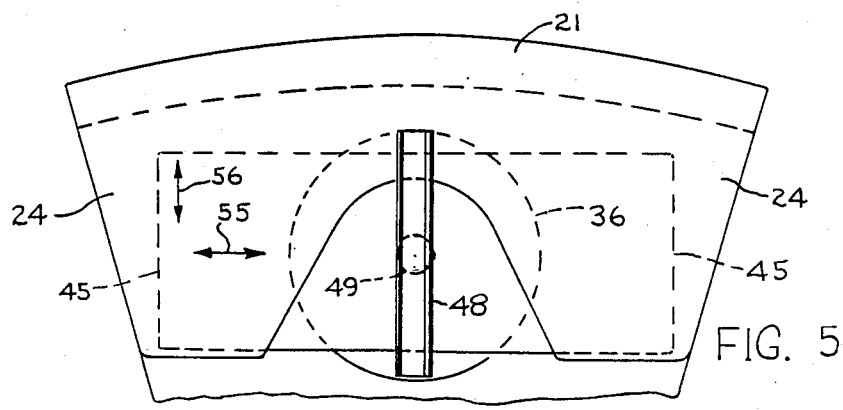
FIG. 5 is a left end elevational view of the mechanism shown in FIG. 4.

Plate 45 preferably has a rectangular plan configuration, as shown in FIG. 5, such that its length dimension 55 extends essentially parallel to bridge wall 21. The width dimension 56 of plate 45 extends essentially normal to bridge wall 21. The plate dimensions 55 and 56 may be varied within limits while still practicing the invention. However, it is preferred to select dimensions whereby the plate has substantially the same size as (or slightly smaller than) brake pad 29, such that the plate can be readily inserted into the space vacated by the brake pad. The length dimension of plate 45 is preferably about twice its width dimension.

Screw 49 is necessarily of sufficient length to effect full retraction of piston 37 without interference between handle 48 and caliper end wall 24. Screw 49 has a length greater than the axial length of piston 36.

The drawings show one particular form that the invention can take. Some variations in structure detail can be used while still practicing the invention.

What is claimed is:

1. A combination with a disc brake caliper that includes a housing structure comprising a bridge wall, a first end wall extending normal to said bridge wall, a second end wall extending normal to said bridge wall in spaced relation to said first end wall, a fluid-containment bore in said first end wall, and a piston slidably positioned in said bore for movement into or out of the space circumscribed by the housing structure;

a first brake pad positionable within the housing structure in engagement with the exposed end of the piston, and a second brake pad positionable within the housing structure in engagement with the inner face of the second end wall;

the improvement comprising means for manually moving the piston into the fluid-containment bore and away from said second end wall;

said manual means comprising a single thrust plate positionable against the inner face of the second end wall after the second brake pad has been worn down and removed;

said single thrust plate having a threaded hole at a central point along the plate surface, such that the hole is in substantial axial alignment with the piston when the plate is engaged with the inner face of the second end wall;

a screw threaded through said hole so that one end of the screw is engageable with the first brake pad;

and means on the other end of the screw for manually turning said screw, whereby the screw exerts an axial pressure on the first brake pad sufficient to cause said first pad to force the piston into the fluid-containment bore without manually removing fluid from the bore;

said screw having a length greater than the piston length; said single thrust plate being a flat plate devoid of flanges, said plate having a substantial thickness that is less than the thickness of the second brake pad in the unworn state;

said thrust plate having a rectangular plan configuration, with the length dimension thereof extending parallel to the bridge wall and the width dimension thereof extending normal to the bridge wall;

the width dimension of the thrust plate being approximately one half the length dimension, and the length dimension of the thrust plate being approximately the same as the length dimension of the second brake pad, whereby the thrust plate is enabled to fit into the space vacated by a worn brake pad.

* * * * *